(No Model.)
C. WILCOX.
THILL COUPLING.
No. 528,351. Patented Oct. 30, 1894.
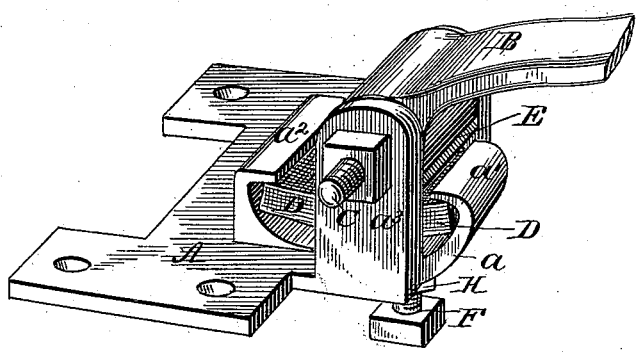
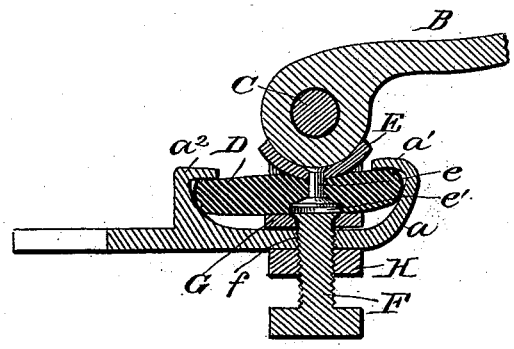
Witnesses:
J. M. Fowler Jr.
Louis H. Lee
Cornelius Wilcox
Inventor;
By Benj. G. Cort
Attorney

UNITED STATES PATENT OFFICE.

CORNELIUS WILCOX, OF SUNBURY, OHIO.

THILL-COUPLING.

SPECIFICATION forming part of Letters Patent No. 528,351, dated October 30, 1894.

Application filed April 28, 1894. Serial No. 509,384. (No model.)

*To all whom it may concern:*

Be it known that I, CORNELIUS WILCOX, a citizen of the United States, residing at Sunbury, in the county of Delaware and State of Ohio, have invented certain new and useful Improvements in Thill-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to thill couplings of the anti-rattler type.

The object of the invention is to provide a coupler of this character which shall be simple of construction, durable in use and comparatively inexpensive of production.

With these objects in view the invention consists of certain features of construction and combination of parts which will be hereinafter set forth.

In the drawings, Figure 1, is a perspective view of the thill coupling, and Fig. 2, is a longitudinal vertical sectional view of the same.

A, denotes the plate adapted to be secured to the axle of a vehicle. This plate is formed with a forwardly extending tongue $a$ the end of which is curved upward and backward as shown at $a'$ which in connection with a similar hook-like portion $a^2$, and the usual apertured ears $a^3$ forms a pocket to receive a yielding bearing for the eye of the thill iron B journaled between the said ears by a bolt C. This bearing consists of a strip of rubber D having secured to it a curved metallic bearing face E. The rivet $e$ which secures the bearing face to the rubber has its head countersunk as shown at $e'$ for the purpose hereinafter explained.

F, denotes a screw working through a hole $f'$ in the bottom of the pocket, hereinbefore mentioned, and swiveled to the upper end of this screw is a disk G. H, denotes a binding nut on said screw.

When the parts are assembled as shown in the drawings, the upper end of the screw is beneath the recess $e'$ and the disk against the rubber strip. Now, by turning the screw, the metal bearing face will be forced against the eye of the thill iron and held thereagainst by a yielding pressure. In working this screw upward it will be noticed, that owing to the disk and the recess in the rubber strip, the rubber will be forced upward without the tendency to twist to one side as would be the case if the screw came in contact with it.

Another important feature of the invention is the making of the plate, hooks, tongue and ears in one piece, thereby greatly reducing the cost.

From the foregoing description taken in connection with the accompanying drawings the operation and advantages of my invention will be apparent.

After the screw has been properly adjusted, by turning the binding nut up against the plate, all liability of the parts becoming loose and rattling, is entirely overcome.

Having thus described my invention, what I claim, and desire to secure by Letters Patent of the United States, is—

1. A thill coupler comprising a plate having two apertured ears, a thill iron journaled between said ears, a yielding bearing located beneath said strip and provided with a recess in its lower side, a screw projecting through said plate with its upper end under said recess and a disk swiveled to the said upper end of said screw, substantially as herein described.

2. A thill coupler comprising a plate having two apertured ears, a thill iron journaled in said ears, a yielding bearing located beneath the eye of the thill iron, a curved plate riveted thereto with the head of the rivet countersunk in the under side of the yielding bearing, a screw working through said plate with its upper end under the countersink and a disk swiveled to said upper end of said screw, substantially as herein described.

3. A thill coupler comprising a plate having a forwardly projecting tongue terminating in a rearwardly directed hook, a forwardly directed hook and two apertured ears all integral with said plate, a thill iron journaled in said ears, a rubber strip located beneath the eye of said thill iron, a curved plate riveted thereto with the head of the rivet countersunk in the lower face of the rubber strip, a screw extending through said plate with its end under the countersink, a disk swiveled to said screw, and a binding nut, substantially as herein described.

In testimony whereof I affix my signature in presence of two witnesses.

CORNELIUS WILCOX.

Witnesses:
LEROY PERFECT,
FRANK PAUL.